United States Patent [19]

Mathieu

[11] Patent Number: 4,617,119

[45] Date of Patent: Oct. 14, 1986

[54] BLOOD EXCHANGE APPARATUS

[75] Inventor: Bernd Mathieu, Spiesen, Fed. Rep. of Germany

[73] Assignee: Eduard Fresenius, Fed. Rep. of Germany

[21] Appl. No.: 142,417

[22] Filed: Apr. 21, 1980

[30] Foreign Application Priority Data

May 5, 1979 [DE] Fed. Rep. of Germany ....... 2918140

[51] Int. Cl.$^4$ .............................................. B01D 13/00
[52] U.S. Cl. ................................ 210/321.3; 210/493.1
[58] Field of Search ............ 422/48; 210/321.4, 321.3, 210/493.1

[56] References Cited

U.S. PATENT DOCUMENTS

| 3,396,849 | 8/1968 | Lande et al. ...................... 422/48 X |
| 3,738,495 | 6/1973 | Esmond ............................. 210/321.3 |
| 3,780,870 | 12/1973 | Esmond ............................. 210/321.4 |
| 4,261,830 | 4/1981 | Schael et al. ..................... 210/321.3 |

Primary Examiner—Frank Spear
Attorney, Agent, or Firm—Andrus, Sceales, Starke & Sawall

[57] ABSTRACT

The present blood exchange device comprises a plurality of membrane film layers formed by folding a continuous band of a suitable membrane film into a plurality of continuous folds and by inserting sealing masks around the edges of the folds. Apertures are provided, preferably at the corners of the folded package in such a manner that one set of apertures communicates with one set of chambers while another set of apertures communicates with another set of chambers formed between the folds of the membrane film layers. The chambers of one set alternate with the chambers of the other set.

7 Claims, 8 Drawing Figures

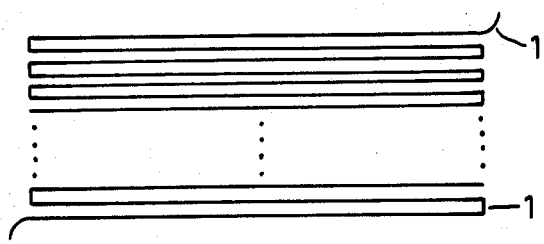
Fig.1
Fig.2
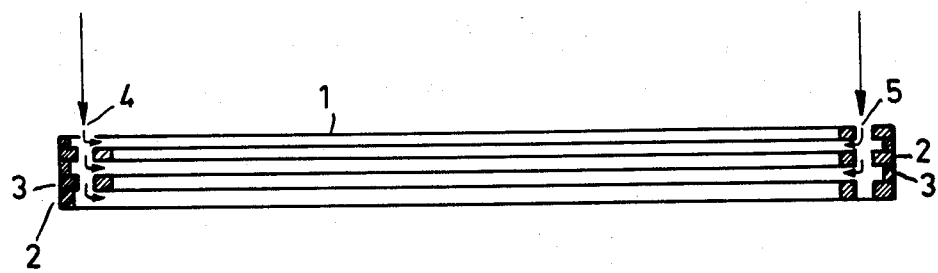
Fig.3
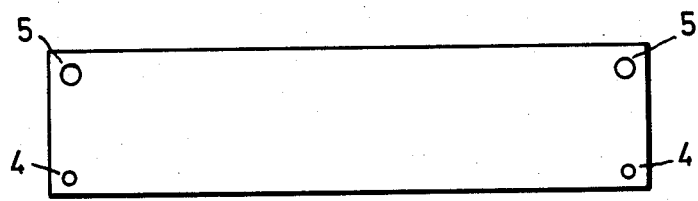
Fig.4
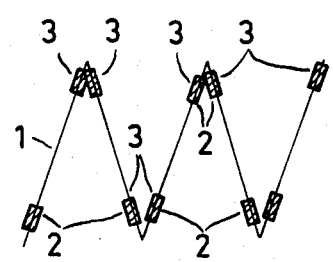
Fig.5
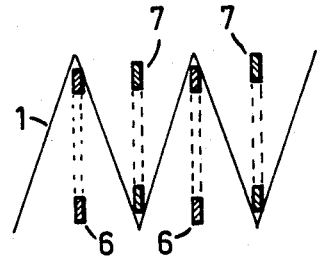

...

BLOOD EXCHANGE APPARATUS

BACKGROUND OF THE INVENTION

The invention relates to a blood exchange apparatus comprising a plurality of layers of a membrane film which layers are supported at a distance from one another, and which layers form chambers therebetween. Blood flows through every second chamber and an exchange liquid flows through each respective intermediate chamber.

Similar blood exchange devices of this type, which operate according to the cross flow principle, have been known for a long time. An earlier proposal by the applicant was directed to the introduction of the counter flow principle. A further proposal by the applicant permits the introduction of the exchange liquid perpendicularly to the membrane plane. In that instance, the chambers are sealed off from the input and output conduits for the blood and for the exchange liquid by means of a poured sealant.

SUMMARY OF THE PRESENT INVENTION

The object of the invention is to simplify the manufacturing of such a blood exchange device, so that it may be produced completely automatically in assembly line fashion. However, said exchange apparatus has simultaneously a higher degree of efficiency than known devices of this type.

In order to achieve the stated object, the invention provides for a blood exchange device of the aforementioned type in which sealing masks are arranged between the peripheral edges of neighboring films of the layers; and in which these masks have openings arranged in pairs at opposite edge zones of the masks, which openings are aligned perpendicularly through the layers, whereby in each instance one opening of each pair communicates with every second chamber formed between the films, and whereby the other opening of each pair communicates with the respective intermediate chambers.

Sealing off the individual chambers in this manner permits avoiding the poured sealant with which blood exchange devices of the stated type were sealed heretofore and, which sealant is expensive and defect prone.

A method for the manufacturing of a blood exchange device, provides that the device is formed by means of folding the membrane film, whereby the masks are applied or inserted between the layers formed by the folding.

Other advantageous embodiments of the invention are disclosed in the appended claims and in the detailed description.

BRIEF DESCRIPTION OF THE DRAWING

The invention is described in more detail in the following text, by way of example, and with reference to the drawings, wherein:

FIG. 1 shows an arrangement of the membrane film position looking in the flow direction;

FIG. 2 shows the flow system to the chambers through bores perpendicular to the plane of the membrane film;

FIG. 3 shows a plan view of the blood exchanging device according to the invention;

FIG. 4 shows schematically a section during the manufacturing of a blood exchange device according to the invention;

FIG. 5 shows schematically a section during the manufacturing of another exemplary embodiment of the invention;

DETAILED DESCRIPTION OF THE PREFERRED EMBODIMENTS

FIG. 1 shows schematically the arrangement of the membrane film 1 folded into a packet comprising a single band.

Heretofore, the individual layers of the membranes were primarily stacked on one another in the form of hose segments or in the form of individual film sections and glued or poured with a sealant at the facing sides.

FIG. 2 shows an arrangement of the membrane film 1 and of the impermeable masks 2 and 3 chosen according to the invention, so that it is possible to alternately flow blood and exchange liquid through the formed chambers by means of two bores 4, 5 extending perpendicular to the plane of the membrane.

Both of the connecting nipples for blood supply and discharge bores 4 and for exchange liquid supply and discharge bores 5 may each, in this embodiment, be located on a longitudinal side of the device as shown in FIG. 3 or they may be located diagonally opposite one another.

FIG. 4 outlines the position of the masks 2 and 3 imprinted on both sides, whereby the spacing of the membrane films is determined by the arrangement of two half masks one on top of the other.

Figure 6:
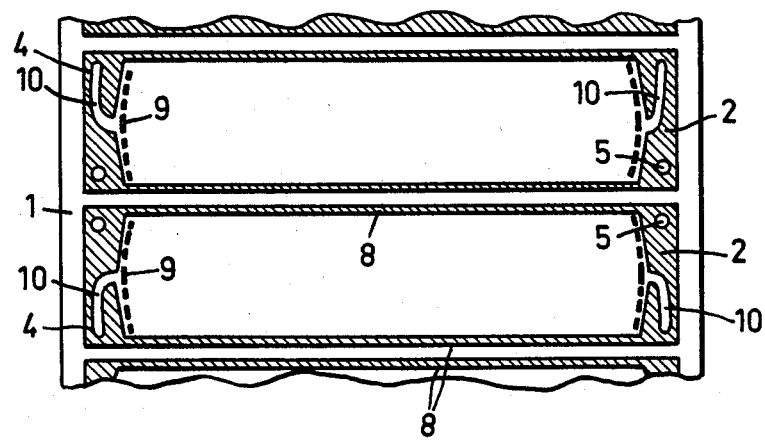
FIG. 6 shows a plan view of one path of a membrane film with the mask on the "blood" side.

FIG. 5 shows as an alternative, the insertion of a mask 6 on the "blood side" and a mask 7 on the side of the exchange liquid of an appropriately folded membrane film 1. As is shown in FIG. 6, the "blood side" mask may also have guiding ribs 9 in addition to the inflow openings 4 and 5 and a circumferential sealed zone 8. These guiding ribs 9 impart a more favorable flow to the blood.

Figure 7:
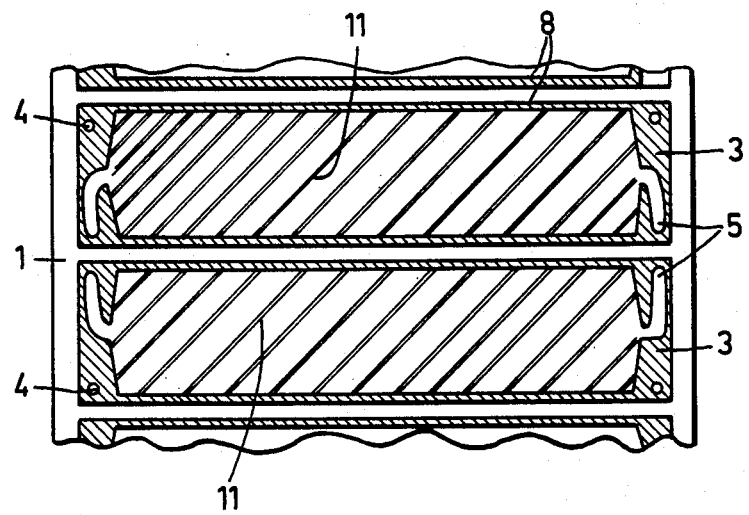
FIG. 7 shows a plan view of one path of a membrane film with the mask on the "exchange fluid" side.

Diagonal strips may be provided advantageously in the masks on the exchange liquid side (FIG. 7). These diagonal strips function equivalently to a "Hoeltzenbein" grid when laid one on top of the other.

Figure 8:
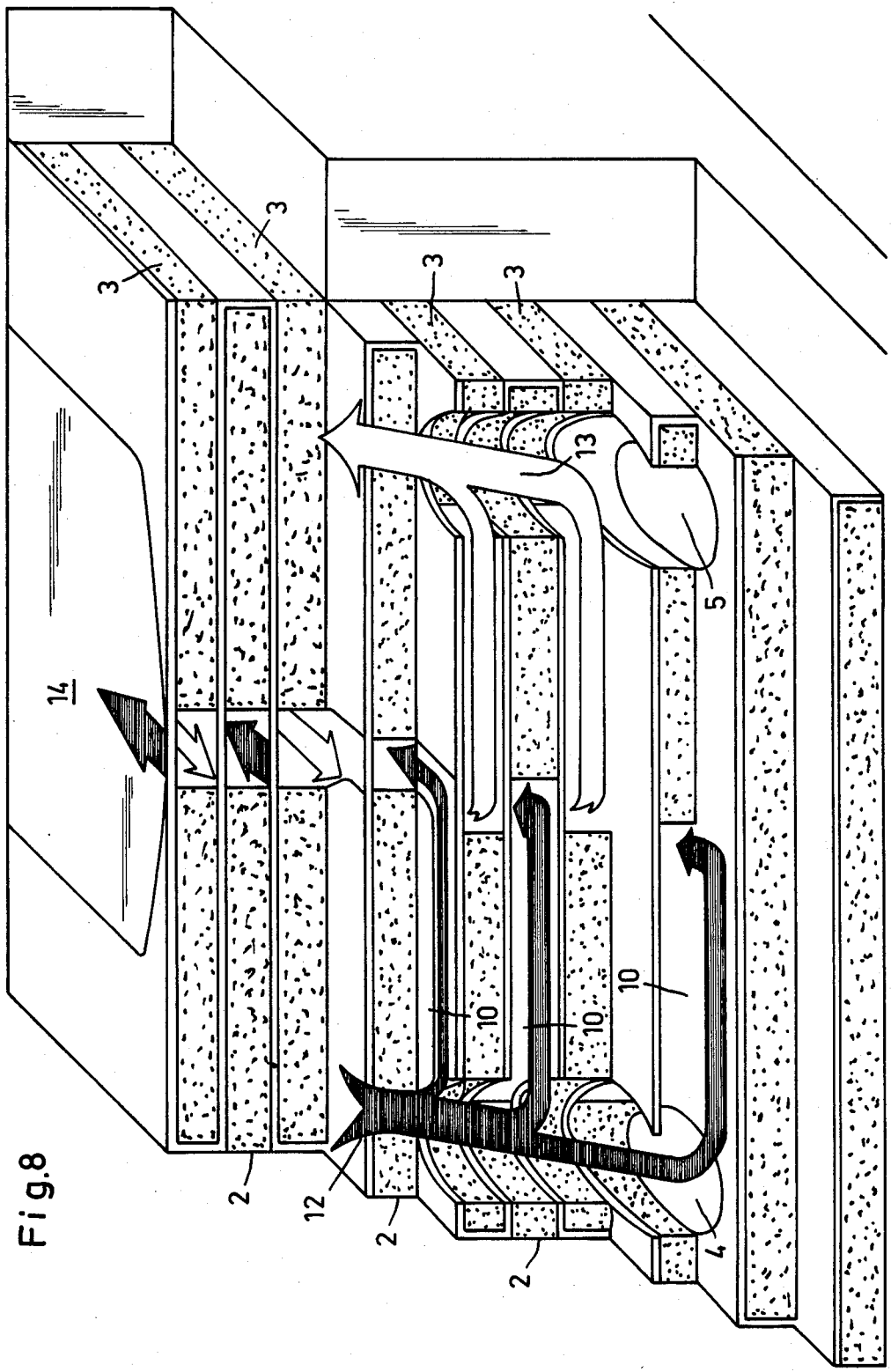
FIG. 8 shows a schematic of the flow of blood and exchange liquid through a device according to the invention.

FIG. 8 shows once again the principle, on which the apparatus according to the invention is based. The blood 12 (black arrows), coming through a vertical bore 4, distributes itself in this instance in every second respective chamber. This is made possible by the masks 2, which have channels 10 connecting the bore 4 with the inner space 14. The exchange liquid 13 (white arrow) exiting from this side of the device, on the other hand, enters only into the bore 5 through corresponding channels in the masks 3. The exchange liquid is carried out of the device by means of the bore 5. A corresponding housing, then, must have connection nipples aligned with the four bores through which blood and exchange liquid may be introduced and removed.

The membrane film may, according to a manufacturing method of the invention, be pulled off the roll, allowing practically a continuous operation of folding and applying of the masks. In this manner, an economical manufacturing of the blood exchanging devices called "plate dialyzers" is made possible. After completion of a layer packet which forms a blood exchange device, the lateral edges may be trimmed.

Instead of providing the masks themselves with the bores 4, 5, these bores 4, 5 may also be applied by means of punching after the completion of a layer packet or during the folding of the layers.

I claim:

1. A blood exchange device for providing exchange between blood and an exchange liquid said device comprising:

a continuous web of exchange membrane arranged in an accordion fold to present a plurality of aligned membrane portions;

first and second sets of mask-like spacer means coated on at least one side of said web at spaced intervals along the web, said spacer means being located between alternate folds of the web and being aligned in the folds of said web for spacing said membrane portions, said spacer means having peripheral rim portions for sealing said membrane portions while providing central flow chambers along the surfaces of said membrane;

blood supply and discharge means extending through said rim portions of said spacer means;

channel means in said first set of spacer means for connecting said blood supply and discharge means to the flow chambers defined by said first set of spacer means for flowing blood through the device alone one sides of said membrane portions;

exchange liquid supply and discharge means extending through said rim portion of said spacer means; and channel means in said second set of spacer means for connecting said exchange liquid supply and discharge means to the flow chambers defined by said second set of spacer means for flowing exchange liquid through the device along the other sides of said membrane portions.

2. The blood exchange device according to claim 1 wherein one set of said mask-like spacer means is coated on one side of said web and said second set of mask-like spacer means is coated on the other side of said web.

3. The blood exchange device according to claim 2 wherein said first and second sets of spacer means each include spacer portions abutting in the accordion folds of said continuous web for spacing said membrane portions.

4. The blood exchange device according to claim 1 wherein said first set of spacer means includes flow guide means for the blood.

5. The blood exchange device according to claim 1 wherein said second set of spacer means includes a plurality of diagonal strips extending through said central flow chambers.

6. The blood exchange device according to claim 1 wherein said first and second sets of mask-like spacer means are formed of an impervious material.

7. The blood exchange device according to claim 1 wherein said blood and exchange liquid supply and discharge means comprises bores extending through said aligned spacer means.

* * * * *